United States Patent
Kanhere et al.

(10) Patent No.: US 9,032,381 B2
(45) Date of Patent: May 12, 2015

(54) STATE RECOVERY METHODS AND APPARATUS FOR COMPUTING PLATFORMS

(75) Inventors: Abhay S. Kanhere, Fremont, CA (US); Saurabh Shukla, Santa Clara, CA (US); Suriya Subramanian, Sunnyvale, CA (US); Paul Caprioli, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 50 days.

(21) Appl. No.: 13/538,175

(22) Filed: Jun. 29, 2012

(65) Prior Publication Data

US 2014/0007066 A1 Jan. 2, 2014

(51) Int. Cl.
*G06F 9/45* (2006.01)
*G06F 9/455* (2006.01)

(52) U.S. Cl.
CPC .................. *G06F 9/45516* (2013.01)

(58) Field of Classification Search
CPC ......... G06F 8/443; G06F 8/445; G06F 8/447; G06F 8/4441; G06F 8/433; G06F 11/3466; G06F 2201/865; G06F 8/4442; G06F 11/3612
See application file for complete search history.

(56) References Cited

U.S. PATENT DOCUMENTS

| 7,506,217 | B2 | 3/2009 | Borin et al. |
| 7,757,221 | B2 | 7/2010 | Zheng et al. |
| 2005/0086451 | A1 | 4/2005 | Yates, Jr. et al. |
| 2006/0294508 | A1 | 12/2006 | Berkowits et al. |
| 2008/0134159 | A1 | 6/2008 | Guo et al. |
| 2008/0141012 | A1 | 6/2008 | Yehia et al. |
| 2010/0153776 | A1* | 6/2010 | Vick et al. ........................ 714/15 |
| 2010/0274972 | A1 | 10/2010 | Babayan et al. |
| 2011/0119526 | A1 | 5/2011 | Blumrich et al. |
| 2011/0167416 | A1 | 7/2011 | Sager et al. |
| 2012/0198427 | A1* | 8/2012 | Schmidt ......................... 717/151 |
| 2013/0262838 | A1 | 10/2013 | Al-Otoom et al. |
| 2013/0283249 | A1 | 10/2013 | Kanhere et al. |
| 2013/0311758 | A1 | 11/2013 | Caprioli et al. |
| 2014/0156933 | A1 | 6/2014 | Shaikh et al. |

FOREIGN PATENT DOCUMENTS

WO 2013048468 4/2013

OTHER PUBLICATIONS

International Searching Authority, "International Search Report," issued in connection with International Application No. PCT/US2011/054380, Mar. 1, 2012, 7 pages.

International Searching Authority, "Written Opinion," issued in connection with International Application No. PCT/US2011/054380, Mar. 1, 2012, 7 pages.

(Continued)

*Primary Examiner* — Chuck Kendall
(74) *Attorney, Agent, or Firm* — Hanley, Flight & Zimmerman, LLC (57) ABSTRACT

State recovery methods and apparatus for computing platforms are disclosed. An example method includes inserting a first instruction into optimized code to cause a first portion of a register in a first state to be saved to memory before execution of a region of the optimized code; and maintaining a value indicative of a manner in which a second portion of the register in the first state is to be restored in connection with a state recovery from the optimized code.

22 Claims, 8 Drawing Sheets

(56) References Cited

OTHER PUBLICATIONS

The International Bureau of WIPO, "International Preliminary Report on Patentability," issued in connection with International Application No. PCT/US2011/054380, Apr. 1, 2014, 4 pages.

United States Patent and Trademark Office, "Non-Final Office Action," issued in connection with U.S. Appl. No. 13/995,400, Sep. 17, 2014, 30 pages.

United States Patent and Trademark Office, "Final Office Action," issued in connection with U.S. Appl. No. 13/995,400, Feb. 24, 2015, 21 pages.

Ottoni et al., "Harmonia: A Transparent, Efficient, and Harmonious Dynamic Binary Translator Targeting the Intel® Architecture", 2011 ACM, CF'11, May 3-5, 2011, Ischia, Italy, pp. 1-12.

* cited by examiner

```
Loop:
0x40490a: MOVUPS xmm1 = ds:(rax+rdi*0x1)
0x40490e: MULPS xmm1 = xmm1, xmm0
0x404911: MOVUPS xmm2 = ds:(rbx+rdi*0x1)
0x404915: ADDPS xmm1 = xmm1, xmm2
0x404918: MOVUPS ds:(rcx+rdi*0x1) = xmm1
0x40491c: MOVUPS xmm1 = ds:0x10(rax+rdi*0x1)
0x404921: MULPS xmm1 = xmm1, xmm0
0x404924: MOVUPS xmm2 = ds:0x10(rbx+rdi*0x1)
0x404929: ADDPS xmm1 = xmm1, xmm2
0x40492c: MOVUPS ds:0x10(rcx+rdi*0x1) = xmm1
0x404931: ADD rdi = rdi, 0x20
0x404935: CMP rdi, rdx
0x404938: JL Loop (0x40490a)
0x40493a: //next instruction after exit from loop.
```

FIG. 2

```
// Region Begin
A1: mov RR = 0x40490a
A2: VSAVEUPPER
A3: RTM_Begin
A4: VINSERTF128 ymm0, ymm0,xmm0,0
Loop:
A5: VMOVUPS ymm1 = ds:(rax+rdi*0x1)
A6: VMULPS ymm1 = ymm1, ymm0
A7: VMOVUPS ymm2 = ds:(rbx+rdi*0x1)
A8: VADDPS ymm1 = ymm1, ymm2
A9: VMOVUPS ds:(rcx+rdi*0x1) = ymm1
A10: ADD rdi = rdi, 0x20
A11: CMP rdi, rdx
A12: RTM_end
A13: mov RR = 0x404938
A14: RTM_begin
A15: JL Loop
A16: VEXTRACTF128 xmm2 = ymm2,1
A17: VEXTRACTF128 xmm1 = ymm1,1
RTM_End
A18: VRESTOREUPPER
A19: mov RR = 0x40493a
A20: JumpOriginal RR
```

300 — braces group A3–A12 as 302, and A14–A17 as 304.

```
// Region Begin
800: VSAVEUPPER
804: VINSERTF128 ymm0, ymm0,xmm0,0
808: RTM_Begin
Loop:
812: VMOVUPS ymm1 = ds:(rax+rdi*0x1)
816: VMULPS ymm1 = ymm1, ymm0
820: VMOVUPS ymm2 = ds:(rbx+rdi*0x1)
824: VADDPS ymm1 = ymm1, ymm2
828: VMOVUPS ds:(rcx+rdi*0x1) = ymm1
832: ADD rdi = rdi, 0x20
836: CMP rdi, rdx
840: RTM_end
844: RTM_begin
848: JL Loop
852: RTM_End
856: VEXTRACTF128 xmm2 = ymm2,1  //state recovery
860: VEXTRACTF128 xmm1 = ymm1,1
864: VRESTOREUPPER
868: RTM_end
868: JumpOriginal RR
```

116

| PC RECOVERY TABLE | | |
|---|---|---|
| TRANSLATED PROGRAM COUNTER | RECOVERED PROGRAM COUNTER | EXTRACT? |
| [800, 804] | 0x40490a | No |
| [808, 808] | 0x40490a | Yes |
| [844, 844] | 0x404938 | Yes |
| [868, 868] | 0x40493a | Yes |

STATE RECOVERY METHODS AND APPARATUS FOR COMPUTING PLATFORMS

FIELD OF THE DISCLOSURE

This disclosure relates generally to computing platforms and, more particularly, to state recovery methods and apparatus for computing platforms.

BACKGROUND

Some computing platforms attempt to improve machine level execution of code by translating the code according to one or more optimization techniques. For example, original code corresponding to an iterative loop may be optimized into translated code to better utilize resources of the computing platform. In such instances, when the translated code is executed in lieu of the original code, an event (e.g., an interrupt, an exception, a trap, termination of an iterative loop, etc.) may result in a need to recover a state of the computing platform. For example, when an interrupt occurs during execution of translated code corresponding to an iterative loop, the system may need to recover to a state that would have resulted from execution of the original code. The state of the computing platform to be recovered includes information such as, for example, register content and/or pointer values (e.g., a value of a program counter corresponding to an instruction of the original code). As the translated code often includes different instructions and/or differently ordered instructions than the original code, recovery of the state of the computing platform presents challenges.

DETAILED DESCRIPTION

Example methods, apparatus, and articles of manufacture disclosed herein provide a state recovery mechanism for computing platforms that optimize original code into translated code. In particular, examples disclosed herein enable such computing platforms to recover to an expected state (e.g., according to execution of the original code) when, for example, an exit from an execution of the translated code occurs (e.g., in response to an interrupt, exception, trap, etc.) or when an iteration of the translated code ends. The state of the computing platform to be recovered includes information such as, for example, register content and/or pointer values (e.g., a value of a program counter corresponding to an instruction of the original code) corresponding to a point in program execution to which the computing platform is to return.

As described in greater detail below, examples disclosed herein insert instructions and/or metadata into dynamically translated code that enable recovery of register values and/or pointer values. Moreover, as described in greater detail below, examples disclosed herein interpret information provided by a generator of the translated code (e.g., an optimizer operating according to one or more optimization techniques to translate the code). Examples disclosed herein utilize the interpretations to generate and maintain one or more tracking values (e.g., bitvectors) that indicate how the state of the registers is to be recovered should the need arise.

Examples disclosed herein utilize the inserted instructions and the tracking values to recover the proper state of the computing platform when needed. In doing so, examples disclosed herein avoid the need to repeatedly move (e.g., copy) data of the registers and/or pointers for each region (e.g., atomic region) of the translated code and/or for each iteration of the translated code. Moreover, the significant additional overhead incurred by having to repeatedly move the data is avoided via the examples disclosed herein.

Figure 1:
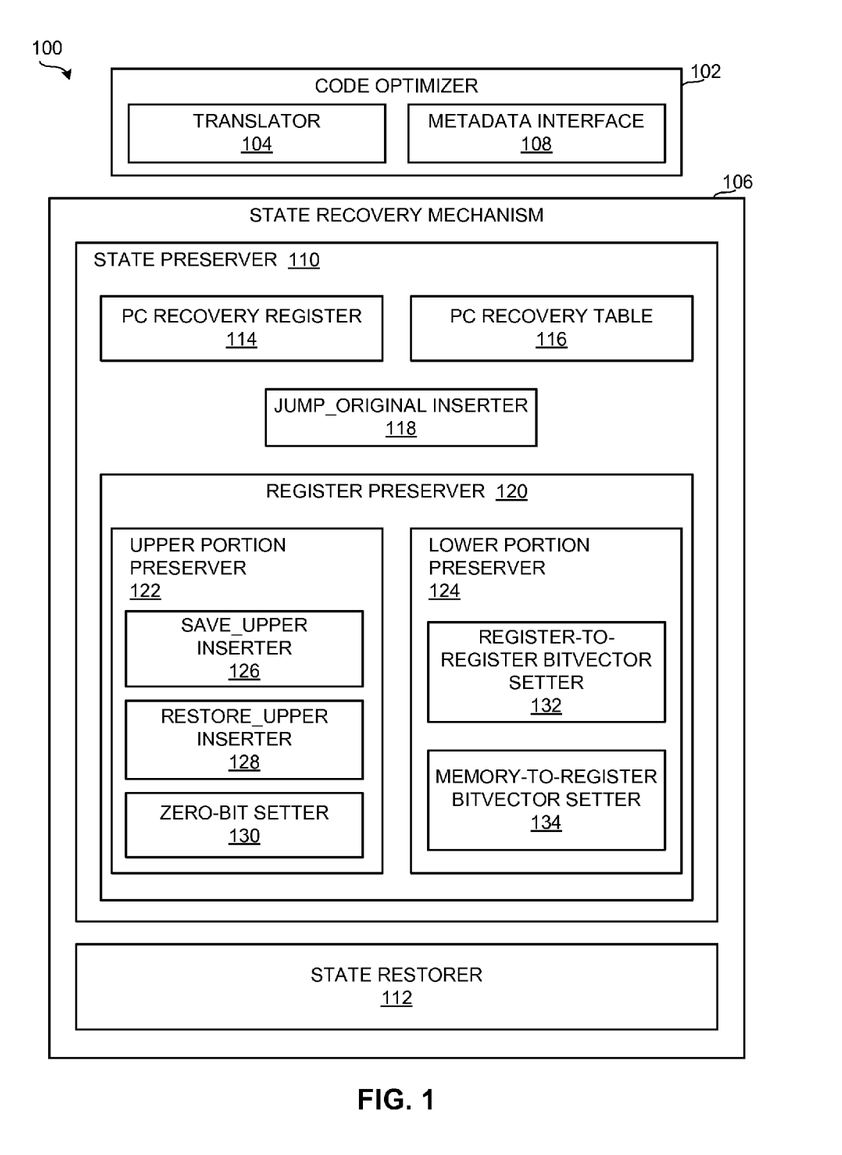
FIG. 1 is a block diagram of an example computing platform including an example state recovery mechanism disclosed herein.

FIG. 1 illustrates an example computing platform 100 in which example method, apparatus, and/or articles of manufacture disclosed herein can be implemented. FIG. 1 includes a code optimizer 102 that the computing platform 100 uses to improve performance through one or more optimization techniques. In particular, the example code optimizer 102 includes a translator 104 that receives a set of original instructions and alters the original code to form translated code. As used herein, the terms "original code" and "original instructions" refer to pre-optimization code or instructions of, for example, a program or application. For example, the term "original instructions" may refer to native and/or non-native instructions that have not yet been or which will not be translated by the code optimizer 102 and/or any other optimization component. As used herein, the terms "translated code" and "translated instructions" refer to post-optimization code or instructions code of, for example, a program or application. For example, "translated instructions" may refer to instructions that have been translated by the translator 104 of the code optimizer 102 and/or any other optimization component.

In the illustrated example of FIG. 1, the translator 104 implements a vector widening technique to optimize original code. Vector widening optimization is useful when original code intended for execution via registers of a first size is to be executed via registers of a second size larger than the first size. In other words, original code may be intended for compilation and execution on a first machine having registers of the first size. However, the original code may be compiled and executed on a second machine (e.g., a more modern or advanced computing platform than the first machine) having registers of the second, larger size. In such instances, vector widening optimization translates the original code to take advantage of the additional space in the larger registers of the second machine.

In some examples, vector widening optimization involves using the additional bits (e.g., relative to the amount of register bits expected by the original code) of the larger registers for parallel execution of more than one instruction (or set of instructions) in the same register. For example, the translator 104 may generate optimized code that enables multiple threads (e.g., each corresponding to adjacent loop iterations) to utilize the same register by, for example, using the upper bits of the larger registers. Without the vector widening optimization provided by the example translator 104, the multiple threads utilize separate registers. Accordingly, the vector widening optimization provided by the example translator 104 results in more efficient use of system resources and, thus, better performance (e.g., as measured by processing speed). The vector widening optimization implemented by the example translator 104 of FIG. 1 is further described below in connection with FIGS. 2-4.

The example translator 104 of FIG. 1 also utilizes restricted transactional memory (RTM) in connection with the optimization of the original code. In brief, RTM provides a hardware mechanism for executing code in atomic regions, which may be executed in parallel. An atomic region of code (sometimes referred to as a transaction) is an isolated set of instructions that writes to registers and memory as the instructions are executed. The register and memory writes of an atomic region are committed when the region is fully executed (e.g., each instruction of the region is executed as intended). However, when execution of the atomic region is aborted (e.g., in response to an interrupt), the writes made during execution of the atomic region are rolled back or undone. RTM and the associated instructions enable hardware to implement the rollback of the register and memory writes. When RTM is used to execute code, some instructions are grouped into an atomic region or transaction that is defined by an RTM_BEGIN instruction (e.g., XBEGIN in an Intel® architecture) and an RTM_END instruction (e.g., XEND in an Intel® architecture).

To enable the rollback of register and memory writes made during a transaction, systems in which RTM is implemented provide data to other system components (e.g., state recovery components) depending on, for example, a point in the code at which an abort event (e.g., an interrupt, a trap, an exception, etc.) occurs. If an abort event occurs when code within a defined RTM transaction or region (e.g., between the corresponding RTM_BEGIN and RTM_END instructions) is being executed, an address of the corresponding RTM_BEGIN instruction is made available to, for example, state recovery components. If an abort event occurs when code outside a defined RTM transaction or region (e.g., outside the corresponding RTM_BEGIN and RTM_END instructions) is being executed, a program counter (e.g., a pointer an address) of the last retired instruction in the translated code is made available to, for example, state recovery.

Thus, the example optimizer 102 and the example translator 104 of FIG. 1 implement a vector widening optimization for instructions to be executed in RTM. The vector widening optimization improves performance of original code via utilization of additional register space. Further, the use of RTM enables transactional execution of code that can be rolled back such that the computing platform 100 can recover to a particular state. While the examples disclosed herein are described in connection with vector widening and RTM, the examples disclosed herein can be utilized in additional or alternative environments and/or in connection with additional or alternative types of optimizations.

The example of FIG. 1 includes a state recovery mechanism 106 constructed in accordance with teachings of this disclosure. As described in greater detail below, the example state recovery mechanism 106 of FIG. 1 inserts instructions disclosed herein into translated or optimized code to enable a recovery of a state of the computing platform 100. Moreover, as described in detail below, the example state recovery mechanism 106 of FIG. 1 generates and maintains tracking values (e.g., bitvectors) that store information that can be used to recover a state of the computing platform 100. In other words, the example tracking values generated and maintained by the example state recovery mechanism 106 of FIG. 1 indicate a manner in which the state of the computing platform 100 can be recovered. To generate and maintain such tracking values, the state recovery mechanism 106 of FIG. 1 communicates with a metadata interface 108 of the example optimizer 102. As described in detail below, the example optimizer 102 provides information related to the translation of original code to the state recovery mechanism 106 via the metadata interface 108. In some examples, the metadata interface 108 facilitates the communication between the state recovery mechanism 106 and the optimizer 102 via a handshake relationship. For example, the metadata interface 108 informs the example state recovery mechanism 106 of locations (e.g., within registers and/or in memory) at which data corresponding to the recovery state can be retrieved. Additional communications between the example state recovery mechanism 106 and the metadata interface 108 are described below.

The example state recovery mechanism 106 of FIG. 1 includes a state preserver 110 and a state restorer 112. The example state preserver 110 of FIG. 1 provides instructions and tracking values that enable the state restorer 112 to recover the computing platform 100 to a desired state in response to, for example, an exit event (e.g., an abort, a trap, an exception) or completion of an atomic region of the translated code. For example, when translated code experiences an exit event or a region of the translated code has been completed, the return instruction pointer (RIP) of the translated code points to an address of the translated code to which execution is to jump in response to the event or completion. To properly recover the desired state of the computing platform 100 when needed, the example state preserver 110 tracks an address of the original code associated with the address of the translated code to which the RIP points. In other words, the RIP of the translated code points to a point in the translated code and the state preserver 110 tracks (and makes available to the example state restorer 112) the address in the original code corresponding to that point in the translated code. By tracking the address in the original code corresponding to the RIP of the translated code, the example state preserver 110 is aware of the address in the original code to which execution should return upon, for example, completion of the translated code or an exit from the translated code. The address of the original code at which execution resumes (e.g., when exiting from a loop being executed via translated code) is sometimes referred to as a program counter (PC). In other words, the PC for the original code corresponds to an address of the next instruction of the original code to be executed.

The example state preserver 110 of FIG. 1 includes first and second mechanisms to track and recover the appropriate PC for the original code. In particular, the example state preserver 110 of FIG. 1 implements a PC recovery register 114 and a PC recovery table 116. The example PC recovery register 114 stores an address of the original code for the PC in the native format of the original code addressing scheme. The example state preserver 110 cooperates with the example optimizer 102 to insert load instructions into the translated code that load the appropriate address (e.g., the original code address for the appropriate next instruction) into the PC recovery register 114. The load instructions for the PC recovery register 114 are inserted into the translated code at points in execution at which the value of the PC should be updated. For example, when an exit event occurs in connection with the translated code during execution of an atomic region (e.g., a chunk of code corresponding to an iteration of a loop), the value of the PC to be loaded into the PC recovery register 114 should be a first value. Further, when an exit event occurs in connection with the translated code after execution of the atomic region is complete, the value of the PC to be loaded into the PC recovery register 114 should be a second value different than the first value. In this example scenario, the example state preserver 110 cooperates with the code optimizer 102 to insert a first load instruction for the PC recovery register 114 at a first point in the translated code before the atomic region. The first load instruction moves the first value for the PC into the PC recovery register 114. Further, the example state preserver 110 cooperates with the code optimizer 102 to insert a second load instruction for the PC recovery register 114 at a second point in the translated code after the atomic region. The second load instruction moves the second value for the PC into the PC recovery register 114. Accordingly, the example PC recovery register 114 of FIG. 1 stores a value corresponding to the address in the original code depending on a location in the translated code at which the exit event occurs.

Figure 2:
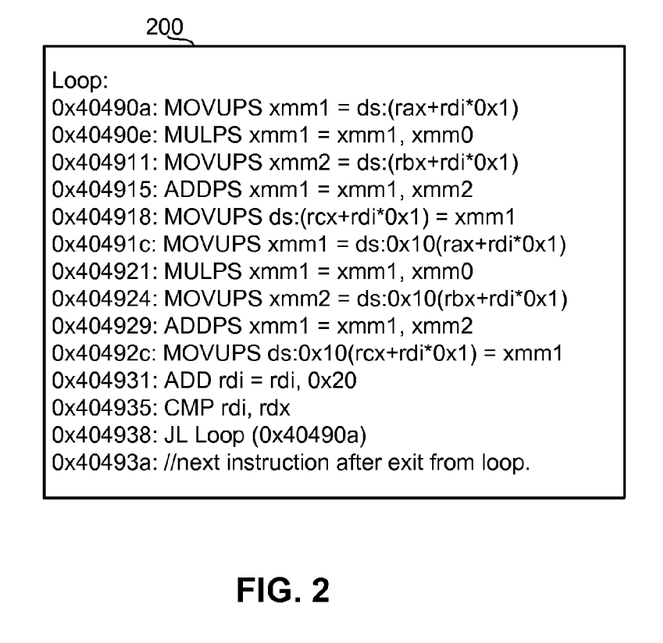
FIG. 2 is a representation of an example loop in original code.
Figure 3:
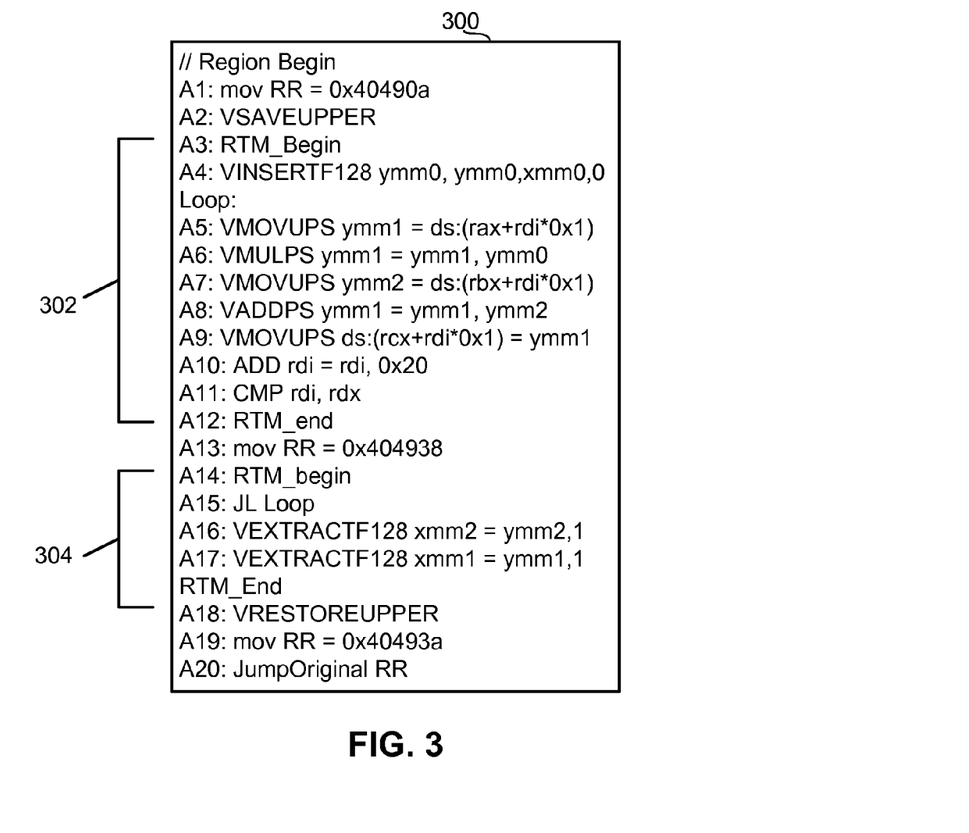
FIG. 3 is a representation of the example loop of FIG. 2 in translated code that utilizes the example return instruction pointer (RIP) recovery register of FIG. 1.

An example implementation of the recovery ability provided by the PC recovery register 114 is shown in connection with FIG. 2 and FIG. 3. FIG. 2 illustrates an example section of original code 200 that is to be translated by the example translator 104. The example original code 200 of FIG. 2 is a SAXPY loop (Single-precision alpha X plus Y). The example of FIG. 2 shows an address for each instruction of the original code 200. FIG. 3 illustrates an example translation 300 of the original code 200 of FIG. 2. The example translated code 300 of FIG. 3 includes different instructions than the original code 200 and, thus, presents challenges to recovering the proper PC and the proper state of the corresponding registers. As described above, the example computing platform 100 includes restricted transactional memory (RTM) and the example translator 104 optimizes the original code 200 accordingly. For example, as shown in FIG. 3, the SAXPY loop of the original code 200 has been placed into an RTM transaction by the translator 104. The RTM transactions (which are atomic regions in the example of FIG. 3) are respectively defined by an RTM_BEGIN instruction and an RTM_END instruction. For example, several instructions of the SAXPY loop are implemented in an atomic region 302 of the translated code defined by a first RTM_BEGIN instruction and an RTM_END instruction.

Reference to FIG. 2 shows that an exit event occurring within the atomic region 302 of the translated code 300 should correspond with a return to address 0x40490a of the original code 200. As described above, an exit event occurring within an RTM transaction causes the RIP of the translated code to point to the beginning of the transaction (e.g., the corresponding RTM_BEGIN instruction). Therefore, when an exit event occurs within the atomic region 302 of FIG. 3, the address of the original code to which the PC should correspond is the beginning of the loop. Accordingly, the example state preserver 110 of FIG. 1 cooperates with the code optimizer 102 to insert a first load instruction (mov RR=0x40490a) into the translated code 300 before the atomic region 302 to load the address of the beginning of the loop in the original code 200. As a result, the PC recovery register 114 will store a value of 0x40490a during execution of the atomic region 302. Moreover, the example state preserver 110 of FIG. 1 cooperates with the code optimizer 102 to insert a second load instruction (mov RR=0x404938) into the translated code 300 before a second atomic region 304 to load a different address of the original code 200. In particular, the PC recovery register 114 is loaded with a value of 0x404938 during execution of the second atomic region 304. As shown in FIG. 2, this address in the original code 200 corresponds to a loop instruction. Moreover, the example state preserver 110 of FIG. 1 cooperates with the code optimizer 102 to insert a third load instruction (mov RR=0x40493a) into the translated code 300 after the first and second atomic regions 302, 304 to load a different address of the original code 200. In particular, the PC recovery register 114 is loaded with a value of 0x40493a after execution of the first and second atomic regions 302, 304. As shown in FIG. 2, this address in the original code 200 corresponds to a next instruction in the original code 200.

Thus, the example state preserver 110 of FIG. 1 maintains the value of the example PC recovery register 114 (e.g., via one or more load instructions) to correspond to the appropriate address of the original code 200 to which execution is to return. In some examples, the state preserver 110 uses data provided by the optimizer 102 via the metadata interface 108 to determine which address of the original code 200 corresponds to the RIP of the translated code 300 during execution of the translated code 300 and/or as the original code 200 is optimized. In other words, the example optimizer 102 can inform the example state preserver 110 of the appropriate address of the original code 200 that should be loaded into the PC recovery register 114 depending on, for example, a value of the RIP for the translated code at different points in the translated code 300.

Alternatively, the example state preserver 110 of FIG. 1 can utilize the example PC recovery table 116 to track the correct value of the PC for the original code at different points within the translated code. Similar to the use of the PC recovery register 114 described above, the example state preserver 110 of FIG. 1 utilizes data from the optimizer 102 regarding a correspondence between the current RIP of the translated code and the proper address for the PC of the original code. In other words, the example state preserver 110 communicates with the metadata interface 108 of the code optimizer 102 to determine which value of the PC is appropriate at different point in execution of the translated code. Instead of inserting load instructions into the translated code as described above in connection with the example PC recovery register 114, the example PC recovery table 116 includes one or more address ranges in the translated code and the corresponding appropriate value of the PC of the original code.

Figure 4:
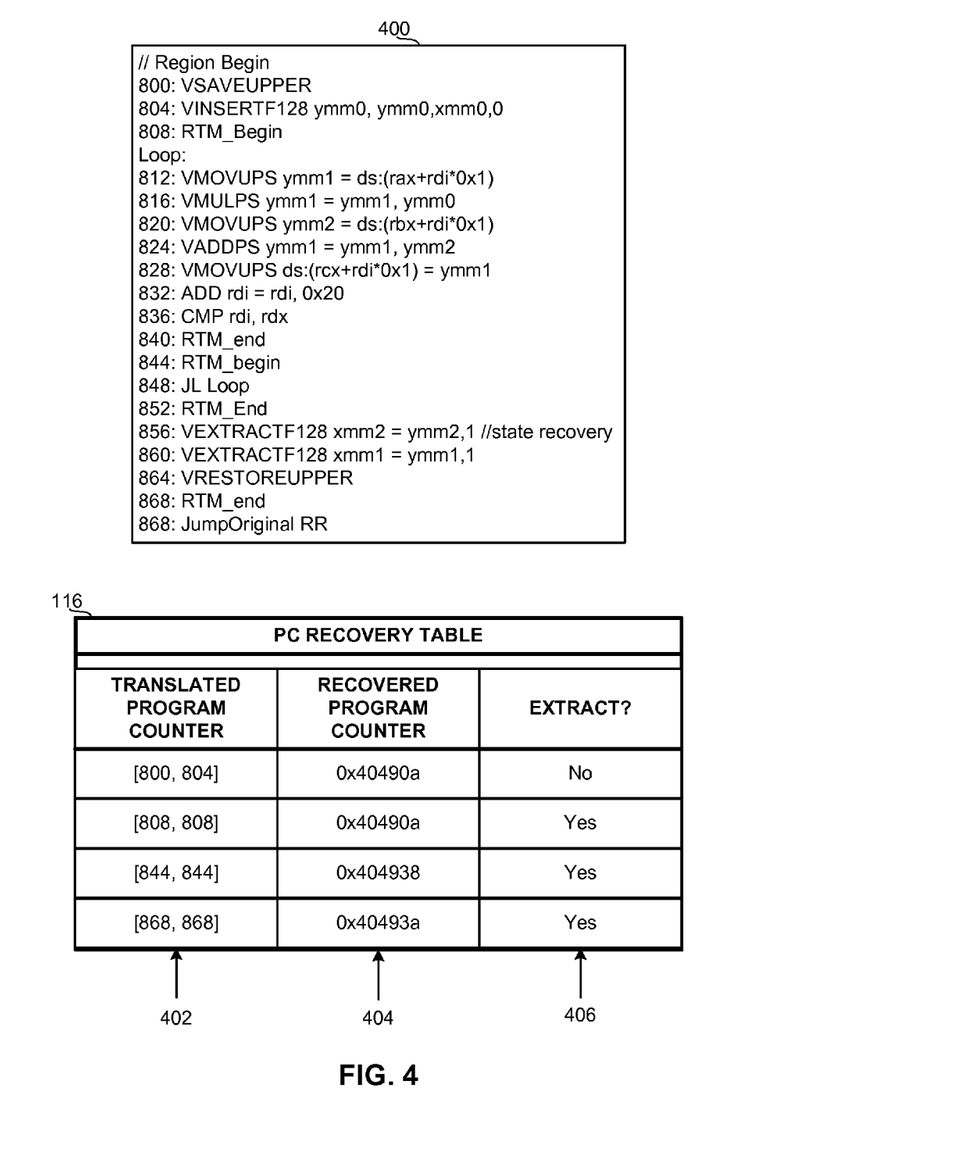
FIG. 4 is a representation of the example loop of FIG. 2 in translated code that utilizes the example RIP recovery table of FIG. 1.

FIG. 4 illustrates an example implementation of the example PC recovery table 116 of FIG. 1. In particular, FIG. 4 includes translated code 400 generated by the example translator 104 based on the original code 200 of FIG. 2 (e.g., the SAXPY loop code). The example translated code 400 is logically similar to the translated code 300 of FIG. 3, but does not include the load instructions associated with the PC recovery register 112 of FIG. 1. The example translated code 400 of FIG. 4 includes multiple boundaries (e.g., atomic region boundaries) that each correspond to a beginning of one address range and an end of another address range. The example table 116 of FIG. 4 includes address range entries 402 for the translated code 400. At some of the boundaries (e.g., transitions between address ranges 402), the appropriate PC value for the original code (e.g., an address in the original code to which execution should jump in the event of an exit from the translated code) undergoes an update or change. Thus, while a first one of the address ranges has a first PC value for the original code, a second one of the address ranges has a second PC value for the original code different from the first value. In other words, the proper value for the PC of the original code depends on the region of the translated code 400 in which an exit event occurs.

The example PC recovery table 116 includes PC values 404 that each correspond to one of the address ranges 402. The example state preserver 110 of FIG. 1 uses data supplied via the metadata interface 108 of the optimizer 102 to fill in the PC values 404. That is, the example optimizer 102 of FIG. 1 informs the state preserver 110 of the proper correspondence between the addresses of the translated code 400 and the associated proper PC value for the original code. Accordingly, should an exit event occur in the translated code 400 at an address in the [800, 804] range, the PC recovery table 116 indicates that the appropriate PC value for the original code is 0x40490a. Other address ranges 402 and the corresponding PC values 404 are shown in FIG. 4.

The example PC recovery table 116 also includes an EXTRACT bit 406. The example EXTRACT bit 406 of FIG. 4 indicates whether content of the registers has changed such that recovery of the content is necessary upon an exit event. That is, in some instances, execution of the translated code may not progress to a point at which content of the registers is altered. If the content of the registers has not been altered, no need exists for recovery or re-creation of the proper state of the registers. The example EXTRACT bit 406 provides an option to avoid unnecessary restore procedures. In the illustrated example of FIG. 1, the optimizer 102 provides metadata to the state preserver 110 indicative of a point in the translated code 400 at which register content is to be altered. The example state preserver 110 uses the provided metadata to set the EXTRACT bit 406 in the table 116 for ones of the address ranges 402 corresponding to points in the translated code at which register content has changed (or has likely undergone a change). In the example of FIG. 4, a value of 'yes' or 'true' indicates that the registers require state recovery procedures, while a value of 'no' or 'false' indicates that the registers do not require state recovery procedures. The recovery of register content is described in detail below.

The example state preserver 110 of FIG. 1 implements a JUMP_ORIGINAL instruction for use in the translated code generated by the example code optimizer 102. In the example of FIG. 1, the state preserver 110 includes a JUMP_ORIGINAL inserter 118 to insert the instruction at a point in the translated code. In some examples, the point at which the JUMP_ORIGINAL instruction is to be inserted is based on data provided to the state preserver 110 via the metadata interface 108. That is, the example code optimizer 102 of FIG. 1 can inform the state preserver 110 of the point in execution of the translated code at which the JUMP_ORIGINAL instruction should be inserted. In the example translated code 300 of FIG. 3 and the example translated code 400 of FIG. 4, the JUMP_ORIGINAL inserter 118 inserts the JUMP_ORIGINAL instruction at the end of the translated code.

The example JUMP_ORIGINAL instruction provided by the state preserver 110 obtains the appropriate PC value for the original code such that execution is returned to the correct address in the original code (e.g., upon completion of the translated code). Depending on which one of the PC recovery register 114 or the PC recovery table 116 is being used to track the proper PC value for the original code, the example JUMP_ORIGINAL instruction either accesses the PC recovery register 114 or analyzes the PC values 404 of the PC recovery table 116. The returned value of the PC for the original code is then used to jump execution to the corresponding address of the original code. In the illustrated examples of translated code 300 and 400 of FIGS. 3 and 4, the inserted JUMP_ORIGINAL instruction is placed at the end of the translated code. Accordingly, the proper PC value of the address in the original code should correspond to the next instruction of the original code after completion of the example loop. In particular, the proper value of the PC for the original code is 0x40493a when the JUMP_ORIGINAL instruction is encountered in the translated code 300, 400.

In addition to the proper PC value for the original code to which execution is to return upon a state recovery event, the example state preserver 110 tracks and maintains a state of the registers that should be restored upon a state recovery event. To enable recovery of the state of the registers, the example state preserver 110 includes a register preserver 120. The example register preserver 120 preserves states of different types of registers such as, for example, vector registers and general purpose registers. In some instances, the example register preserver 120 preserves the state of a vector register differently than a general purpose register.

As described above, the example code optimizer 102 and the example translator 104 of FIG. 1 implement a vector widening technique to optimize original code intended for (e.g., written and/or compiled for) registers of a first size that will be executed using registers of a second size larger than the first size. The size or length of the registers for which the original code is intended is referred to herein as OLEN (original length). In the illustrated examples, the OLEN of the original code is a number of bits in the type of register for which the original code is intended. For example, when the original code is SSE128 code intended for Xmm registers, OLEN is one hundred twenty-eight (128). The size or length of the registers of the computing platform 100 that are used to execute code is referred to herein as TLEN (target length). In the illustrated examples, the TLEN is a number of bits in the type of registers for which the translated code is optimized. For example, when the translator 104 is to translate original code into translated code for execution in 512 bit AVX512 registers, TLEN is five hundred twelve (512). As described in detail below, OLEN and TLEN are used by the example register preserver 120 to preserve a state of the registers.

In the illustrated example of FIG. 1, the register preserver 120 includes an upper portion preserver 122 and a lower portion preserver 124. Vector widening performed by the example optimizer 102 translates the original code such that additional bits of the larger target registers are utilized to, for example, widen a loop for parallel execution of more than one loop iteration. That is, the vector widening provided by the example optimizer 102 may involve one or more registers including multiple portions each dedicated to execution of a separate thread or loop iteration. As a result, some content (e.g., data) of the registers is replaced as the translated code is executed. However, as described above, the state of the registers corresponding to the expected state associated with the original code is to be tracked such that the state of the registers can be recovered (e.g., in response to an exit event and/or at boundaries of atomic regions). The example upper portion preserver 122 is configured to preserve an upper portion of the vector registers utilized by the computing platform 100 to execute the translated code. Further, the example lower portion preserver 124 is configured to preserve a lower portion of the vector registers utilized by the computing platform 100 to execute the translated code.

The example upper portion preserver 122 of FIG. 1 includes a SAVE_UPPER inserter 126, a RESTORE_UPPER inserter 128, and a zero-bit setter 130. The example upper portion preserver 122 implements a SAVE_UPPER instruction that is inserted into translated code to preserve an upper portion of vector registers of the computing platform 100. In particular, the SAVE_UPPER instruction causes data of the upper portion of the registers to be saved to memory (e.g., Random Access Memory (RAM)). In the example of FIG. 1, the upper portion preserver 122 defines the portion of the registers to be saved to memory according to the values of OLEN and TLEN. For example, the upper portion preserver 122 defines the upper portion of the vector registers as a range of [TLEN-1:OLEN]. Thus, the SAVE_UPPER instruction results in bits [TLEN-1:OLEN] of the vector registers to be saved to memory. To continue the above example, when the original code is SSE128 code intended for Xmm registers and the translator 104 is to translate the original code for execution in 512 bit AVX512 registers, the SAVE_UPPER instruction provided by the example register preserver 120 saves the bits of the address range [511:128] of the vector registers to memory.

In the example of FIG. 1, the register preserver 120 cooperates with the code optimizer 102 to determine a location in the translated code at which the SAVE_UPPER instruction is to be inserted. For example, the metadata interface 108 provides the SAVE_UPPER inserter 126 with an address or pointer to an address in the translated code corresponding to a beginning of the translated code or a beginning of an atomic region. As shown in FIGS. 3 and 4, the example SAVE_UPPER inserter 126 inserts the SAVE_UPPER instructions into a beginning portion of the translated code 300, 400 such that the state of the upper portions of the registers is saved to memory before the translated code begins manipulating the content of the vector registers.

The example upper portion preserver 122 also implements a RESTORE_UPPER instruction that is inserted into translated code to restore the upper portion of the vector registers. In particular, the RESTORE_UPPER instruction causes retrieval of the register data from the memory (e.g., as stored via the SAVE_UPPER instruction) and a restoration of the data of the upper portions of the vector registers. As described above, the example of FIG. 1 defines the upper portion of the vector registers as [TLEN-1:OLEN]. Thus, the RESTORE_UPPER instruction results in the data stored in memory via the SAVE_UPPER instruction to be written to the [TLEN-1:OLEN] bits of the vector registers. To continue the above example, when the original code is SSE128 code intended for Xmm registers and the translator 104 is to translate the original code for execution in 512 bit AVX512 registers, the RESTORE_UPPER instruction writes the data stored in memory to the address range [511:128] of the vector registers.

In the example of FIG. 1, the register preserver 120 cooperates with the code optimizer 102 to determine a location in the translated code at which the RESTORE_UPPER instruction is to be inserted. For example, the metadata interface 108 provides the RESTORE_UPPER inserter 128 with an address or pointer to an address in the translated code corresponding to an end of the translated code or an end of an atomic region. As shown in FIGS. 3 and 4, the example RESTORE_UPPER inserter 128 inserts the RESTORE_UPPER instructions at an end portion of the translated code 300, 400 such that the state of the upper portions of the registers is restored after the translated code (or a region of the translated code corresponding to an iteration) is complete and no longer needs access to the vector registers.

Additionally, the example upper portion preserver 122 implements the zero-bit setter 130 to indicate instances in which the upper portion of one or more vector registers are to be zeroed instead of restored from memory. For example, execution of translated code may proceed to a point at which the previous state of the vector registers (e.g., according to the previous expected state associated with the original code) does not correspond to the desired recovery state. In other words, the content of the upper portions of the vector registers that was stored to memory via the SAVE_UPPER instruction may no longer be the desired content for the registers upon an exit from the translated code. In some examples, the register preserver 120 (or some other component) may determine that the state to be saved includes all zeroes in the upper portion(s). In such instances, the SAVE_UPPER instruction may not have to be executed. Instead, the zero-bit setter 130 may be informed that the registers are to be zeroed instead of being restored from memory. To avoid the unnecessary procedure of recovering the state of the upper portions in such instances, the example zero-bit setter 130 maintains a tracking value, such as a bitvector, for the vector registers that can be set when the upper portions of the registers should be zeroed instead of recovered from memory. For example, the bitvector may include a bit for each vector register and the respective bits can be set to '1' or '0' by the example zero-bit setter 130. In the illustrated example, the metadata interface 108 informs the example zero-bit setter 130 when one of the vector registers no longer needs to be restored from memory for a proper state recovery (e.g., upon an exit event from the translated code). In response, the zero-bit setter 130 sets the corresponding bit in the bitvector. Without information from the metadata interface 108 (or any other suitable source of information) to the contrary, the example zero-bit setter 130 keeps the bits of the bitvector at '0' such that the upper portions of the vector registers are recovered from memory. As described below in connection with the example state restorer 112, the values of the bitvector managed by the zero-bit setter 130 are checked when the RESTORE_UPPER instruction is encountered during execution of the translated code. For vector registers having a set bit (e.g., '1') in the bitvector, the upper portion ([TLEN-1:OLEN]) is zeroed. For vector registers having an unset bit (e.g., '0') in the bitvector, the upper portion is recovered from memory.

The example lower portion preserver 124 of FIG. 1 implements a register-to-register bitvector setter 132 to enable preservation and recovery (e.g., in response to an exit event in the translated code) of the lower portions of vector registers of the computing platform 100. The example lower portion preserver 124 generates and maintains a register-to-register bitvector that is set by the register-to-register bitvector setter 132 in accordance with data provided via the metadata interface 108. As described above, the optimizer 102 and the translator 104 utilize additional bits of the larger vector registers (relative to the register size for which the original code is written and/or compiled) via the vector widening technique. This utilization of the vector register bits may include moving the data of the lower portion of the vector register to a different portion of the same vector register. In other words, the vector widening implemented by the example optimizer 102 may involve storing a state of the lower portion of a first vector register at a different location within the first vector register for purposes of a later potential recovery. Thus, the state of the first vector register that is to be recreated or restored upon, for example, an exit event is stored in the same first vector register via the optimization of the original code.

When the lower portion of a vector register is to be recovered from the same vector register, the example optimizer 102 provides information to the lower portion preserver 124 regarding a manner in which the lower portion data is to be recovered. In particular, for each vector register, the example metadata interface 108 provides a tracking value indicative of an address range in the respective vector register at which the state recovery data can be found. The tracking value provided by the metadata interface 108 is used by the example register-to-register bitvector setter 132 to set the corresponding bit(s) of the register-to-register bitvector. In the illustrated example, the register preserver 120 defines a value referred to herein as a WidenFactor. The WidenFactor is equal to TLEN/

OLEN. To continue the above example, the WidenFactor of the illustrated example is 512/128, which evaluates to four (4). The tracking value provided by the optimizer 102 for each vector register has a length of log_2(WidenFactor). The register-to-register bitvector includes an entry for each vector register. Therefore, the register-to-register bitvector has a length of log_2(WidenFactor)*(the number of vector registers) bits. To continue the above example, with the assumption that the number of vector registers is equal to 20, the register-to-register bitvector is (2)*(20), which evaluates to forty (40) bits.

For each of the vector registers, the example register-to-register bitvector setter 132 uses the tracking value provided by the optimizer 102 to set the respective bit(s) of the register-to-register bitvector. In the illustrated example, when the tracking value for each vector register has a length of two (2) bits (e.g., when the WidenFactor is four (4)), a value of '00' corresponding to an instance in which the data does not need to be recovered from a region to which the data was relocated. For example, the tracking value being '00' may correspond to an instance in which the lower portion of the vector register was not relocated inside the vector register as part of the optimization process or otherwise does not require a recovery process (e.g., when the translation code has been executed to a point at which the previous state of the register is no longer valid for a state recovery process). On the other hand, the tracking value may be set to '01' '10' or '11.' Each of the possible values of the tracking value provided via the metadata interface 108 corresponds to a region in the corresponding vector register at which the data of a lower portion of the same vector register to be restored can be retrieved.

In particular, the tracking value is set according to an equation to be utilized by the example state restorer 112 when recovering a state of the vector registers. In the illustrated example, where the tracking value is represented by 'd,' the location within a vector register from which the state recovery data is to be retrieved is [OLEN*(d)−1:OLEN*(d−1)]. Further, the lower portion of the vector register is defined as [OLEN−1:0]. Accordingly, upon a state recovery trigger (e.g., an exit event in the translated code), when the lower portion of a vector register is to be recovered from a location within itself, the bits at [[OLEN*(d)−1:OLEN*(d−1)] are copied to [OLEN−1:0] of the vector register. In some examples, one or more additional bits of the vector register are zeroed to comply with one or more requirements of the register format and/or protocol.

As an example implementation of the register-to-register bitvector, assume that the translator 104 has translated scalar 64 bit double precision floating point original code for a 512 bit AVX register system. Thus, OLEN is sixty-four (64), TLEN is five hundred twelve (512), the WidenFactor is eight (8), and each vector register has three (3) bits in the register-to-register bitvector. When the metadata interface 108 provides a tracking value of two (2) for a particular vector register, the example register-to-register bitvector setter 132 sets the three bits of the bitvector corresponding to the particular vector register to '010.' When the state restorer 112 checks the appropriate portion of the register-to-register bitvector and determines that the value is '010,' the value of two (2) is inserted into the above equation to identify the proper manner of restoring the lower portion of the particular vector register. When 'd' equal two (2) in the above equation, the state restorer 112 determines that the bits at [127:64] of the vector register are to be copied to [63:0] to restore the lower portion of the vector register.

The example lower portion preserver 124 also generates and maintains a memory-register bitvector that is set by a memory-to-register bitvector setter 134. The example memory-to-register bitvector maintained by the example lower portion preserver 124 indicates whether any of the registers have lower portion data that is to be restored from memory (as opposed to another location of the same register to which the data was relocated per the optimization). For example, the lower portion of some of the vector registers may be stored to memory as part of the optimization. Additionally, in the illustrated example of FIG. 1, entire content of the general purpose registers are copied to memory before execution of the translated code. For each of the registers having data to be restored from memory, the example memory-to-register bitvector setter 134 sets a corresponding entry of the memory-to-register bitvector. Thus, when an entry in the memory-to-register bitvector for a particular vector register is set (e.g., to '1'), the example state restorer 112 is informed that the lower portion of the vector register is to be recovered from memory upon a state recovery trigger (e.g., an exit from the translated code). Further, when an entry in the memory-to-register bitvector for a particular general purpose register is set (e.g., to '1'), the example state restorer 112 is informed that the entire content of the general purpose register is to be recovered from memory. On other hand, when the entry in the memory-to-register bitvector for the general purpose register is not set (e.g., is '0'), the example state restorer 112 is informed that the general purpose register need not be recovered (e.g., when the stored state of the general purpose register is no longer valid for a state recovery process). The example state restorer 112 recovers the lower portions of the vector registers and/or the entire general purpose registers according to the memory-to-register bitvector by copying the appropriate values from memory to the lower OLEN bits of the register (bit range [OLEN−1:0]).

While an example manner of implementing the platform 100 has been illustrated in FIG. 1, one or more of the elements, processes and/or devices illustrated in FIG. 1 may be combined, divided, re-arranged, omitted, eliminated and/or implemented in any other way. Further, the example code optimizer 102, the example translator 104, the example state recovery mechanism 106, the example metadata interface 108, the example state preserver 110, the example state restorer 112, the example PC recovery register 114, the example PC recovery table 116, the example JUMP_ORIGINAL inserter 118, the example register preserver 120, the example upper portion preserver 122, the example lower portion preserver 124, the example SAVE_UPPER inserter 126, the example RESTORE_UPPER inserter 128, the example zero-bit setter 130, the example register-to-register bitvector setter 132, the example memory-to-register bitvector setter 134 and/or, more generally, the example platform 100 of FIG. 1 may be implemented by hardware, software, firmware and/or any combination of hardware, software and/or firmware. Thus, for example, any of the example code optimizer 102, the example translator 104, the example state recovery mechanism 106, the example metadata interface 108, the example state preserver 110, the example state restorer 112, the example PC recovery register 114, the example PC recovery table 116, the example JUMP_ORIGINAL inserter 118, the example register preserver 120, the example upper portion preserver 122, the example lower portion preserver 124, the example SAVE_UPPER inserter 126, the example RESTORE_UPPER inserter 128, the example zero-bit setter 130, the example register-to-register bitvector setter 132, the example memory-to-register bitvector setter 134 and/or, more generally, the example platform 100 of FIG. 1 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended system or apparatus claims of this patent are read to cover a purely software and/or firmware implementation, at least one of the example code optimizer 102, the example translator 104, the example state recovery mechanism 106, the example metadata interface 108, the example state preserver 110, the example state restorer 112, the example PC recovery register 114, the example PC recovery table 116, the example JUMP_ORIGINAL inserter 118, the example register preserver 120, the example upper portion preserver 122, the example lower portion preserver 124, the example SAVE_UPPER inserter 126, the example RESTORE_UPPER inserter 128, the example zero-bit setter 130, the example register-to-register bitvector setter 132, the example memory-to-register bitvector setter 134 and/or, more generally, the example platform 100 of FIG. 1 are hereby expressly defined to include a tangible computer readable storage medium such as a memory, DVD, CD, Blu-ray, etc. storing the software and/or firmware. Further still, the example platform 100 of FIG. 1 may include one or more elements, processes and/or devices in addition to, or instead of, those illustrated in FIG. 1, and/or may include more than one of any or all of the illustrated elements, processes and devices.

The example state recovery mechanism 106 of FIG. 1 can be implemented via a micro code sequence that is inserted into program execution (e.g., as a micro-code assist). Additionally or alternatively, the example state recovery mechanism 106 can be an explicit recovery handler that invokes a runtime code of the computing platform 100 to perform the functionality disclosed herein.

Figure 5:
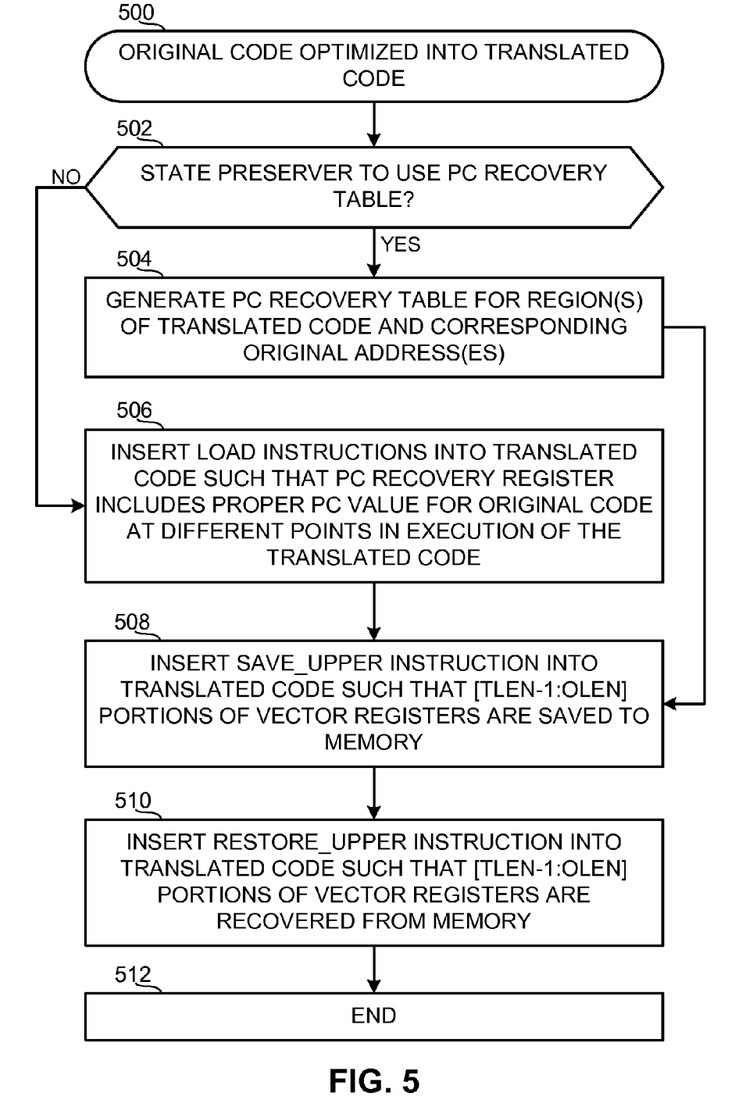
FIGS. 5-7 are flowcharts representative of example machine readable instructions that may be executed to implement the example state recovery mechanism of FIG. 1.
Figure 6:
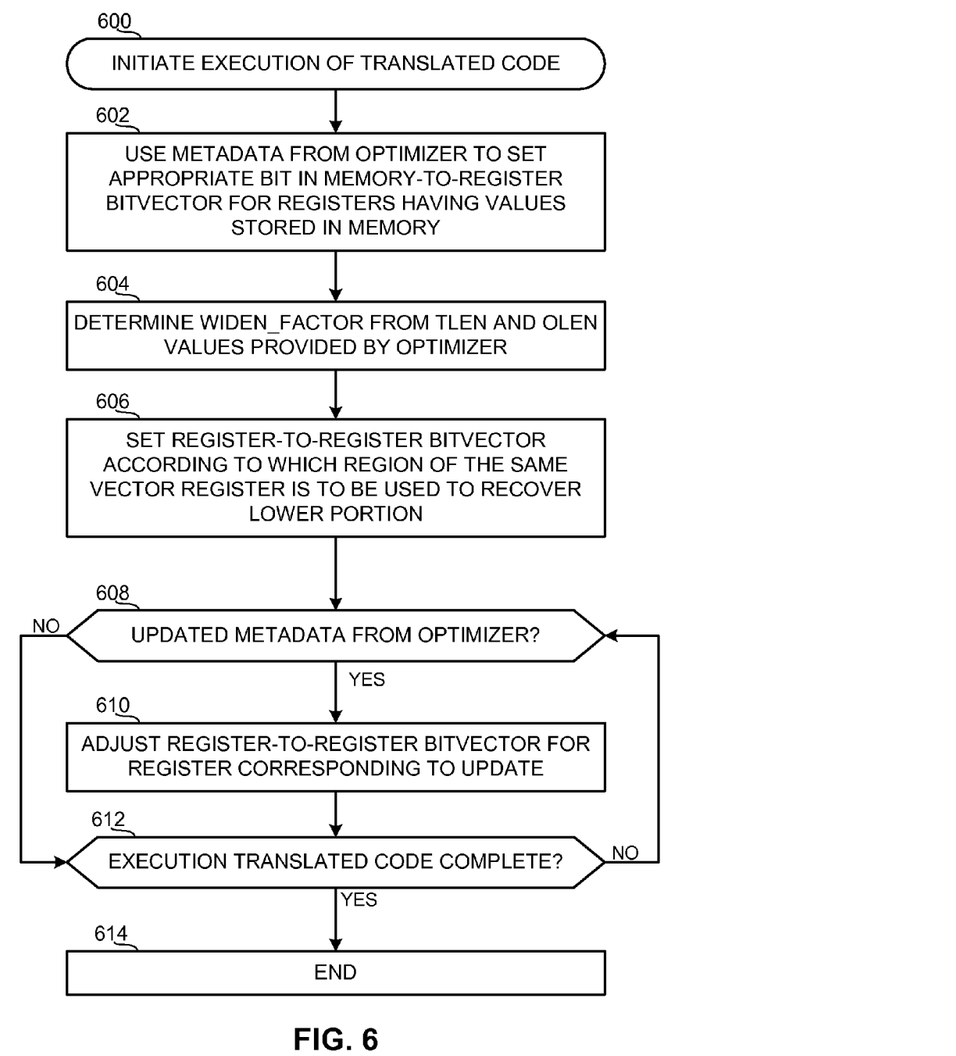
Figure 7:
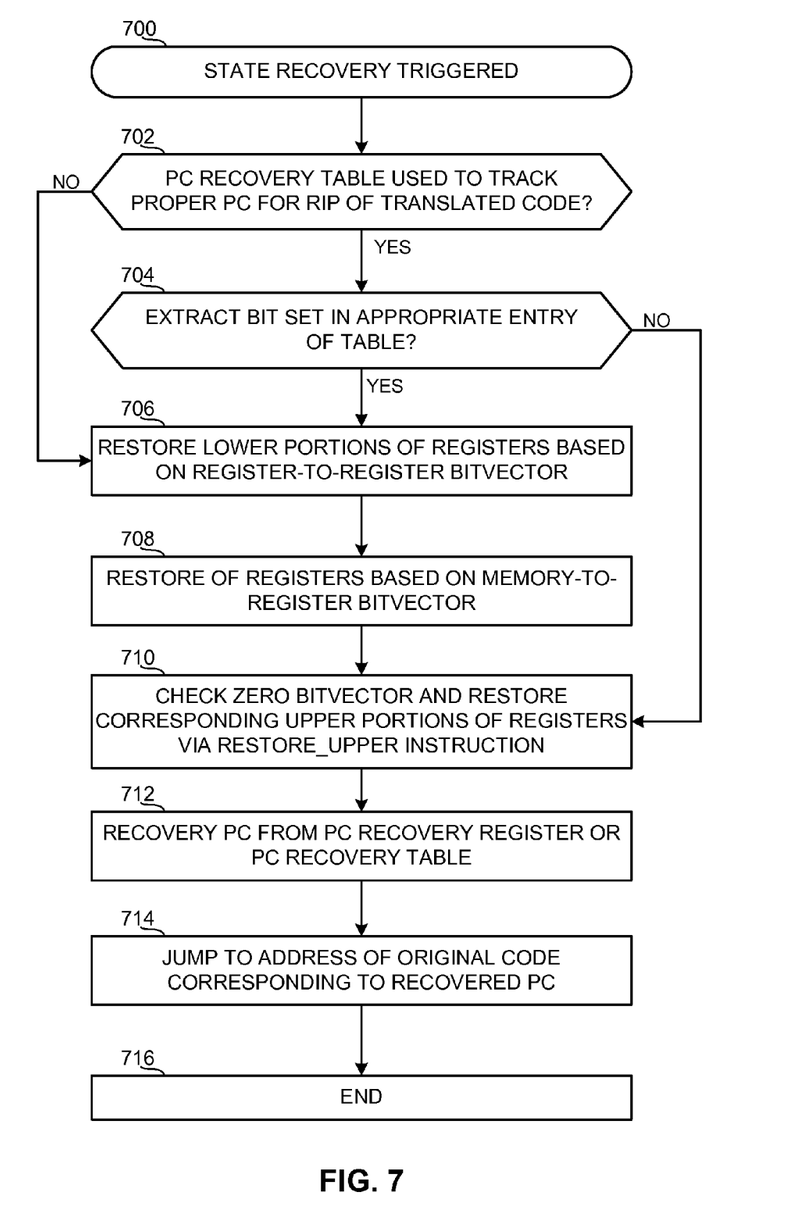

FIGS. 5-7 are flowcharts representative of example machine readable instructions for implementing the example platform 100 of FIG. 1. In the example flowcharts of FIGS. 5-7, the machine readable instructions comprise program(s) for execution by a processor such as the processor 812 shown in the example computer 800 discussed below in connection with FIG. 8. The program(s) may be embodied in software stored on a tangible computer readable medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program(s) is described with reference to the flowcharts illustrated in FIGS. 5-7, many other methods of implementing the example platform 100 may alternatively be used. For example, the order of execution of the blocks may be changed, and/or some of the blocks described may be changed, eliminated, or combined.

As mentioned above, the example processes of FIGS. 5-7 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 5-7 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 5 begins with an indication that original code has been optimized by the example optimizer 102 of FIG. 1 (block 500). For example, the indication that original code has been optimized in FIG. 5 corresponds to an instance of the translator 104 of the optimizer 102 having optimized the SAXPY loop code 200 of FIG. 2 according to one or more vector widening techniques. As described above, such an optimization includes, for example, utilizing additional bits in registers of the platform 100 that are larger than the registers for which the original code 200 is written and/or compiled.

The example state recovery mechanism 106 determines whether the state preserver 110 is configured to utilize the PC recovery register 114 or the PC recovery table 116 to track the proper value for the PC of the original code for a state recovery process (block 502). As described above, the proper value of the PC of the original code is tracked such that execution can resume from the appropriate address according to the original code when, for example, an exit event occurs in connection with the translated code. When the example state preserver 110 is configured to utilize the PC recovery table 116 (block 502), the example state preserver 110 communicates with the optimizer 102 via the metadata interface 108 to generate the example PC recovery table 116 according to the manner that the original code has been translated (block 504). In the illustrated example, the information provided to the state preserver 110 by the optimizer 102 includes values of the PC for the original code that should be used for a state recovery process at different address ranges in the translated code. As shown in FIG. 4, the example PC recovery table 116 includes the provided PC values 404 and the corresponding address ranges 402 of the translated code. As described above, the address ranges 402 of the translated code correspond to, for example, atomic regions and/or the boundaries that define atomic regions of the translated code. When the PC recovery table 116 has been generated in the example of FIG. 5, control then proceeds to block 510.

Referring to block 502, when the state preserver 110 is configured to utilize the PC recovery register 114, the example state preserver 110 communicates with the optimizer 102 via the metadata interface 108 to obtain data to be loaded into the PC recovery register 114. The data to be loaded into the PC recovery register 114 is indicative of a PC value for the original code corresponding to a current point in execution of the translated code. The example state preserver 110 inserts load instructions into the translated code according to the information received from the optimizer 102 such that the data stored in the PC recovery register 114 at different point throughout execution of the translated code includes the proper value of the PC for the original code that should be used for a state recovery process at the respective points in the translated code (block 506).

To preserve the upper portions of the vector registers of the computing platform in a certain state, the example SAVE_UPPER inserter 126 inserts one or more SAVE_UPPER instructions into the translated code (block 508). When executed, the SAVE_UPPER instruction copies bits in the address range [TLEN-1:OLEN] of the vector registers to memory. Further, the example RESTORE_UPPER inserter 128 inserts one more RESTORE_UPPER instructions into the translated code that each correspond to a SAVE_UPPER instruction (block 510). When executed, the RESTORE_UPPER instruction restores the bits in the address range [TLEN-1:OLEN] of the vector registers from memory. The example of FIG. 5 then ends (block 512).

FIG. 6 begins with an initiation of execution of the translated code (block 600). As described above, the translator 104 of the optimizer 102 has translated the original code into optimized code. The example optimizer 102 of FIG. 1 provides information to the state recovery mechanism 106 (e.g., via the metadata interface 108) regarding the optimization of the original code. The example lower portion preserver 124 of FIG. 1 uses the metadata provided by the optimizer 102 to the memory-to-register bitvector via the memory-to-register bitvector setter 134 (block 602). The bit(s) in the bitvector associated with register(s) having content stored in memory for preservation (e.g., such that the content is recovered from memory in response to, for example, an exit event in the translated code) are set by the memory-to-register bitvector setter 134. Accordingly, the memory-to-register bitvector maintained by the lower portion preserver 124 indicates which of the registers, such as the general purpose registers, are to be recovered by copying data from memory.

The example lower portion preserver 124 calculates the WidenFactor for the optimization implemented by the example optimizer 102 (block 604). In the illustrated example, the WidenFactor is TLEN/OLEN. Further, for the vector registers having a state of the corresponding lower portion stored in the same vector register for purposes of a state recovery, the example register-to-register bitvector setter 132 configures the bit(s) in the register-to-register bitvector maintained by the example lower portion preserver 124 (block 606). As described above, the example register-to-register bitvector setter 132 uses a tracking value provided by the optimizer 102 to set the appropriate bit(s) of the register-to-register bitvector. The tracking value provided by the optimizer 102 is indicative of a location in a vector register at which the data of the lower portion to be restored has been relocated. If an updated tracking value is provided by the optimizer 102 during execution of the translated code (block 608), the example register-to-register bitvector setter 132 adjusts the register-to-register bitvector accordingly (block 610). When the execution of the translated code is not complete (block 612), control returns to block 608. Otherwise, the example of FIG. 6 ends (block 614).

FIG. 7 begins with a state recovery process being triggered (block 700). As described above, the state recovery process can be triggered by, for example, an exit event (e.g., an exception, an interrupt, a trap, etc.) occurring in the translated code and/or a completion of the translated code and/or completion of a portion (e.g., an atomic region) of the translated code. When recovering a state of the computing platform 100, the example state recovery mechanism 106 of FIG. 1 is to restore or provide a proper value of the PC for the original code such that the proper point of execution in the original code is identified for the state recovery. The example state recovery mechanism 106 implements the PC recovery register 114 and the PC recovery table 116 that each may be used to track the proper value of the PC for the original code. If the PC recovery table 116 is currently being used to track the PC value (block 702), the example state restorer 112 determines whether the extract bit is set for the appropriate entry in the PC recovery table 116 (block 704). In particular, the address in the translated code corresponding to the triggered state recovery at block 700 has an associated EXTRACT bit 406 in the PC recovery table 116. If the EXTRACT bit 406 is set (block 704), then control proceeds to block 706. Otherwise, if the EXTRACT bit is not set (block 704), control proceeds to block 710.

Thus, if the EXTRACT bit 406 is set in the entry of the PC recovery table 116 (block 704) or if the state preserver 110 is utilizing the PC recovery register 114 rather than the PC recovery table 116 (block 702), the example state restorer 112 restores the lower portions of the vector registers based on the register-to-register bitvector (block 706). As described above, the restoration or recreation of the lower portions of the vector registers uses the respective bit(s) of the register-to-register bitvector to locate the data of the recovery state with the same vector registers. In the illustrated example, the state restorer 112 determines the location within each vector register from which the state recovery data is to be retrieved is as [OLEN*(d)-1:OLEN*(d-1)], where the value of the respective bit(s) of the bitvector is represented by 'd.' Further, the lower portion of the vector register to be restored is defined as [OLEN-1:0].

The example state restorer 112 also restores data to registers, such as the general purposes registers and/or vector registers having data stored in memory, according to the memory-to-register bitvector (block 708). After the data of the lower portions of the vector registers has been restored, the example state restorer 112 executes the RESTORE_UPPER instruction, which checks the value of the zero bitvector and restores the upper portions of the vector registers in accordance with the zero bitvector (block 710). As described above, a bit of the zero bitvector being set results in the corresponding upper portion being zeroed for the restoration thereof. Otherwise, when the bit is not set, the data of the upper portions corresponding to the state being recovered is copied into the vector registers from memory, where the SAVE_UPPER instructions previously stored the data.

The tracked value of the PC for the original code is recovered from the PC recovery register 114 or the PC recovery table depending on which of the recovery mechanisms is being used by the state preserver 110 for the current instance of the translated code (block 712). The example state restorer 112 executes the JUMP_ORIGINAL instruction using the recovered PC value such that execution jumps to the corresponding address in the original code (block 714). The example of FIG. 7 then ends (block 716).

Figure 8:
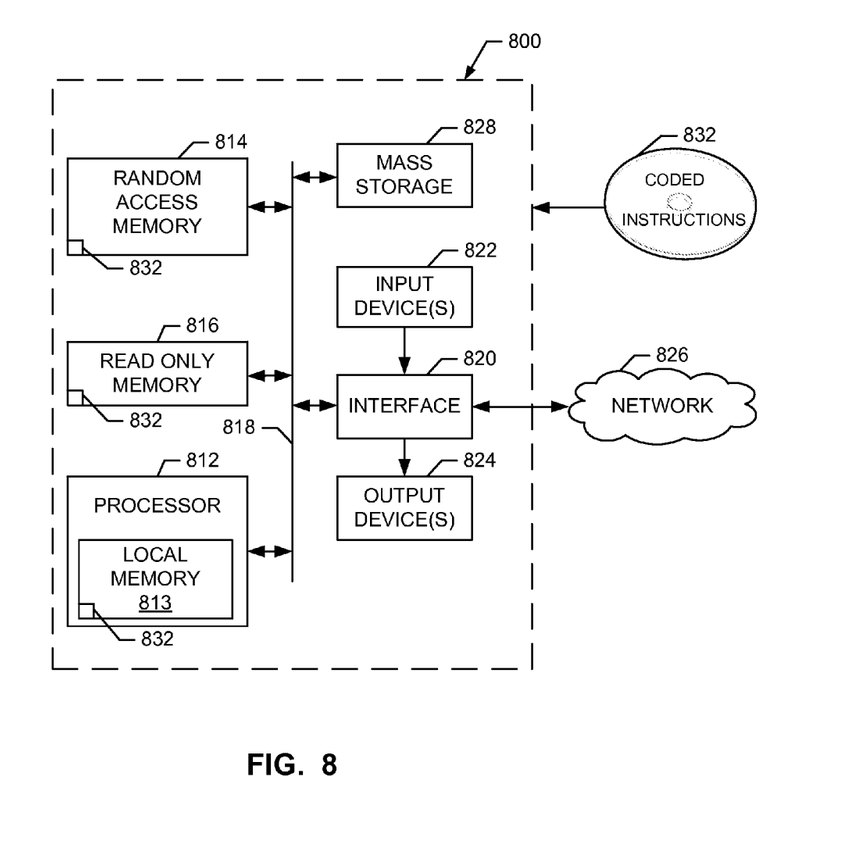
FIG. 8 is a block diagram of an example processing system capable of executing the example machine readable instructions of FIGS. 5-7 to implement the example state recovery mechanism of FIG. 1.

FIG. 8 is a block diagram of a processor platform 800 capable of executing the instructions of FIGS. 5-7 to implement the example platform 100 of FIG. 1. The processor platform 800 can be, for example, a server, a personal computer, an Internet appliance, a DVD player, a CD player, a Blu-ray player, a gaming console, a personal video recorder, a smart phone, a tablet, a printer, or any other type of computing device.

The processor platform 800 of the instant example includes a processor 812. For example, the processor 812 can be implemented by one or more microprocessors or controllers from any desired family or manufacturer.

The processor 812 includes a local memory 813 (e.g., a cache) and is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 also includes an interface circuit 820. The interface circuit 820 may be implemented by any type of interface standard, such as an Ethernet interface, a universal serial bus (USB), and/or a PCI express interface.

One or more input devices 822 are connected to the interface circuit 820. The input device(s) 822 permit a user to enter data and commands into the processor 812. The input device(s) can be implemented by, for example, a keyboard, a mouse, a touchscreen, a track-pad, a trackball, isopoint and/or a voice recognition system.

One or more output devices 824 are also connected to the interface circuit 820. The output devices 824 can be implemented, for example, by display devices (e.g., a liquid crystal display, a cathode ray tube display (CRT), a printer and/or speakers). The interface circuit 820, thus, typically includes a graphics driver card.

The interface circuit 820 also includes a communication device such as a modem or network interface card to facilitate exchange of data with external computers via a network 826 (e.g., an Ethernet connection, a digital subscriber line (DSL), a telephone line, coaxial cable, a cellular telephone system, etc.).

The processor platform 800 also includes one or more mass storage devices 828 for storing software and data. Examples of such mass storage devices 828 include floppy disk drives, hard drive disks, compact disk drives and digital versatile disk (DVD) drives.

The coded instructions 832 of FIG. 5-7 may be stored in the mass storage device 828, in the volatile memory 814, in the non-volatile memory 816, and/or on a removable storage medium such as a CD or DVD.

Example methods include inserting a first instruction into optimized code to cause a first portion of a register in a first state to be saved to memory before execution of a region of the optimized code; and maintaining a value indicative of a manner in which a second portion of the register in the first state is to be restored in connection with a state recovery from the optimized code.

Some example methods further include inserting a second instruction into the optimized code to cause the first portion of the register in the first state to be restored from the memory after execution of the region of the optimized code.

Some example methods further include defining the first portion according to a relationship between a first size of the register and a second size of a second register associated with original code on which the optimized code is based.

In some example methods, the original code is intended for execution in the second register.

In some example methods, the value is to indicate the manner in which the second portion is to be restored by providing a location within the register at which data of the second portion is relocated as part of an optimization of original code.

Some example methods further include maintaining an address of original code on which the optimized code is based, the address corresponding to a point in execution of the original code for a state recovery to the first state.

In some example methods, the maintaining of the address includes inserting load instructions into the optimized code to cause the address to be stored in a dedicated register.

Some example methods further include storing the address in a table having an entry corresponding to the address that includes an address range of the translated code.

Example tangible machine readable storage media include instructions that, when executed, cause a machine to at least: insert a first instruction into optimized code to cause a first portion of a register in a first state to be saved to memory before execution of a region of the optimized code; and maintain a value indicative of a manner in which a second portion of the register in the first state is to be restored in connection with a state recovery from the optimized code.

In some examples, the instructions, when executed, cause the machine to insert a second instruction into the optimized code to cause the first portion of the register in the first state to be restored from the memory after execution of the region of the optimized code.

In some examples, the instructions, when executed, cause the machine to define the first portion according to a relationship between a first size of the register and a second size of a second register associated with original code on which the optimized code is based.

In some examples, the original code is intended for execution in the second register.

In some examples, the value is to indicate the manner in which the second portion is to be restored by providing a location within the register at which data of the second portion is relocated as part of an optimization of original code.

In some examples, the instructions cause the machine to maintain an address of original code on which the optimized code is based, the address corresponding to a point in execution of the original code for a state recovery to the first state.

In some examples, the instructions cause the machine to maintain the address by inserting load instructions into the optimized code to cause the address to be stored in a dedicated register.

In some examples, the instructions cause the machine to store the address in a table having an entry corresponding to the address that includes an address range of the translated code.

Example apparatus include a register having a first size; a translator to optimize original code into translated code, the original code being intended for execution in registers of a second size different than the first size; and a state preserver to: save data of an upper portion of the register in a first state to memory before execution of a region of the translated code; and maintain a value indicative of a location in the register at which data of a lower portion of the register in the first state is relocated in connection with the optimization of the original code.

Some example apparatus further include a recovery table to store an address range of the translated code and a corresponding address of the original code to which execution is to return in response to a state recovery being triggered in connection with the address range of the translated code.

In some examples, the recovery table includes a bit indicative of whether data of the register in the first state is to be restored in response to the state recovery being triggered.

In some examples, the state preserver is to maintain the value based on metadata provided by the translator.

Some example apparatus further include a restorer to restore the data of the upper portion of the register in the first state from the memory in response to a state recovery being triggered.

Some example apparatus further include a restorer to restore data of the lower portion of the register in the first state from the location of the register according to the value.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. A method, comprising:
   inserting a first instruction into optimized code, the first instruction to cause first data of a first portion of a register to be saved to memory before execution of a region of the optimized code; and
   maintaining a value indicative of a location within the register to which second data of a second portion of the register is relocated, the second data to be restored, using the value, to the second portion of the register from the location within the register in connection with a state recovery, the state recovery to restore the register to a state with the first data in the first portion of the register and the second data in the second portion of the register, the first portion of the register being different than the second portion of the register.

2. A method as defined in claim 1, further comprising inserting a second instruction into the optimized code, the second instruction to cause the first data of the first portion of the register to be restored from the memory as part of the state recovery.

3. A method as defined in claim 1, wherein the register is a first register, and further comprising defining the first portion according to a relationship between a first size of the first register and a second size of a second register.

4. A method as defined in claim 3, wherein the optimized code is based on original code structured for execution via the second register of the second size.

5. A method as defined in claim 1, wherein the second data of the second portion of the register is relocated as part of an optimization of original code.

6. A method as defined in claim 1, further comprising maintaining an address of original code on which the optimized code is based, the address corresponding to a point in execution of the original code, the point to be used in the state recovery.

7. A method as defined in claim 6, wherein the maintaining of the address comprises inserting a load instruction into the optimized code to cause the address to be stored in a dedicated register.

8. A method as defined in claim 6, further comprising storing the address in a table having an entry corresponding to the address that includes an address range of the original code.

9. A tangible machine readable storage medium comprising instructions that, when executed, cause a machine to at least:
   insert a first instruction into optimized code, the first instruction to cause first data of a first portion of a register to be saved to memory before execution of a region of the optimized code; and
   maintain a value indicative of a location within the register to which second data of a second portion of the register is relocated, the second data to be restored, using the value, to the second portion of the register from the location within the register in connection with a state recovery, the state recovery to restore the first data to the first portion of the register and the second data to the second portion of the register, the first portion of the register being different than the second portion of the register.

10. A tangible machine readable storage medium as defined in claim 9, wherein the instructions, when executed, cause the machine to insert a second instruction into the optimized code, the second instruction to cause the first data of the first portion of the register to be restored from the memory as part of the state recovery.

11. A tangible machine readable storage medium as defined in claim 9, wherein the register is a first register, and the instructions, when executed, cause the machine to define the first portion according to a relationship between a first size of the first register and a second size of a second register.

12. A tangible machine readable storage medium as defined in claim 11, wherein the optimized code is based on original code structured for execution via the second register of the second size.

13. A tangible machine readable storage medium as defined in claim 9, wherein the second data of the second portion of the register is relocated as part of an optimization of original code.

14. A tangible machine readable storage medium as defined in claim 9, wherein the instructions, when executed, cause the machine to maintain an address of original code on which the optimized code is based, the address corresponding to a point in execution of the original code, the point to be used in the state recovery.

15. A tangible machine readable storage medium as defined in claim 14, wherein the instructions, when executed, cause the machine to maintain the address by inserting a load instruction into the optimized code to cause the address to be stored in a dedicated register.

16. A tangible machine readable storage medium as defined in claim 14, wherein the instructions, when executed, cause the machine to store the address in a table having an entry corresponding to the address that includes an address range of the original code.

17. An apparatus, comprising:
    a register having a first size;
    a translator to translate original code into translated code, the original code structured for execution via registers of a second size different than the first size; and
    a state preserver to:
        save data of an upper portion of the register to memory before execution of a region of the translated code; and
        maintain a value indicative of a location in the register at which data of a lower portion of the register is relocated in connection with translation of the original code.

18. An apparatus as defined in claim 17, further comprising a recovery table to store an address range of the translated code and a corresponding address of the original code to which execution is to return in response to a state recovery being triggered in connection with the address range of the translated code.

19. An apparatus as defined in claim 18, wherein the recovery table comprises a bit indicative of whether data of the register is to be restored in response to the state recovery being triggered.

20. An apparatus as defined in claim 17, wherein the state preserver is to maintain the value based on metadata provided by the translator.

21. An apparatus as defined in claim 17, further comprising a restorer to restore the data of the upper portion of the register from the memory in response to a state recovery being triggered.

22. An apparatus as defined in claim 17, further comprising a restorer to restore data of the lower portion of the register from the location of the register according to the value.

* * * * *